United States Patent [19]
Dalla Betta et al.

[11] Patent Number: 5,308,457
[45] Date of Patent: May 3, 1994

[54] SELF-CONTAINED SYSTEM FOR CONTROLLING GASEOUS EMISSIONS FROM DILUTE ORGANIC SOURCES AND A PROCESS FOR USING THAT SYSTEM

[75] Inventors: Ralph A. Dalla Betta, Mountain View; James C. Schlatter, Sunnyvale; David R. Lane, San Jose; Diana O. Durieux, Campbell, all of Calif.

[73] Assignee: Catalytica, Inc., Mountain View, Calif.

[21] Appl. No.: 681,869

[22] Filed: Apr. 5, 1991

[51] Int. Cl.⁵ .............................................. C25F 5/00
[52] U.S. Cl. ................................. 204/131; 204/182.3; 204/275; 204/301
[58] Field of Search ................. 204/131, 182.3, 275, 204/301

[56] References Cited

U.S. PATENT DOCUMENTS

| | | | |
|---|---|---|---|
| 3,274,755 | 9/1966 | Montagnon et al. | 55/171 |
| 3,616,339 | 10/1971 | Marzluff | 204/131 |
| 3,930,803 | 1/1976 | Winter | 23/277 R |
| 3,969,082 | 7/1976 | Cairns et al. | 23/288 FC |
| 4,088,460 | 5/1978 | Winter | 55/208 |
| 4,094,652 | 6/1978 | Lowther | 55/33 |
| 4,253,925 | 3/1981 | Mason | 204/129 |
| 4,310,406 | 1/1982 | Smith et al. | 204/275 |
| 4,331,631 | 5/1982 | Chapman | 422/180 |
| 4,414,023 | 11/1983 | Aggen et al. | 75/124 |
| 4,565,553 | 1/1986 | Nowack | 55/59 |
| 4,594,135 | 6/1986 | Goldstein | 204/180.1 |
| 4,690,696 | 9/1987 | Sircar et al. | 55/26 |
| 4,702,749 | 10/1987 | Sircar et al. | 55/33 |
| 4,734,394 | 3/1988 | Kosaka et al. | 502/434 |
| 4,737,164 | 4/1988 | Sarkkinen | 55/9 |
| 4,770,678 | 9/1988 | Haslett, Jr. | 55/179 |
| 4,846,852 | 7/1989 | Schweitzer et al. | 55/31 |
| 4,863,494 | 9/1989 | Hayes | 55/59 |
| 4,877,534 | 10/1989 | Nishida et al. | 210/691 |
| 4,881,958 | 11/1989 | Eckardt et al. | 55/179 |
| 4,902,311 | 2/1990 | Dingsfors et al. | 55/60 |
| 4,976,929 | 12/1990 | Cornelison et al. | 422/174 |
| 4,985,211 | 1/1991 | Akiyama et al. | 422/171 |

FOREIGN PATENT DOCUMENTS 52-65175  5/1977  Japan.
54-160589 12/1979  Japan.

OTHER PUBLICATIONS

Dean H. Ritts, "Evaluation of Innovative Volatile Organic Compound and Hazardous Air Pollutant Control Technologies for U.S. Air Force Paint Spray Booths", Air & Waste Management Association, 83rd Annual Meeting & Exhibition, Pittsburgh, Pa. (Jun. 24-29, 1990).

T. J. Lawton, "Towards a Cleaner Environment-Catalytic Incineration in the Printing Industry", *Platinum Metals Review*, 1989, 33, 178-180.

*Primary Examiner*—John Niebling
*Assistant Examiner*—Arun S. Phasge
*Attorney, Agent, or Firm*—Morrison & Foerster

[57] ABSTRACT

This invention is a device and a process for controlling the emission of volatile organic components. The invention is useful on gaseous or vapor-containing streams containing a minor amount of organic material, particularly on fairly dilute streams or those containing only a few parts per million of the organic material. The device is useful in adsorbing organics as might be found emanating from paint spray booths, restaurants, print shops, dry cleaners, furniture manufacturers, and bakeries.

The device may be two-stage including an adsorber and a catalytic oxidation reactor or may be of such a configuration that the same bed is used both as the adsorber and catalytic oxidation reactor. In the former configuration, a first stage contains an electrically conductive adsorbent bed, potentially comprising an adsorbent placed on a conductive support of fibers, foil, or other structure. The adsorbent removes the organic from the gaseous stream as that stream passes through. When the adsorbent is loaded with volatile organic, a voltage is applied to the conductive support and the adsorbed organic material is desorbed. The stream containing the desorbed organic is passed through a catalyst bed where a catalyst (which may also be on a conductive support) oxidizes the volatile organic to a harmless material which may (perhaps after other treatment) be emitted to the atmosphere.

24 Claims, 3 Drawing Sheets

Fig. 1A
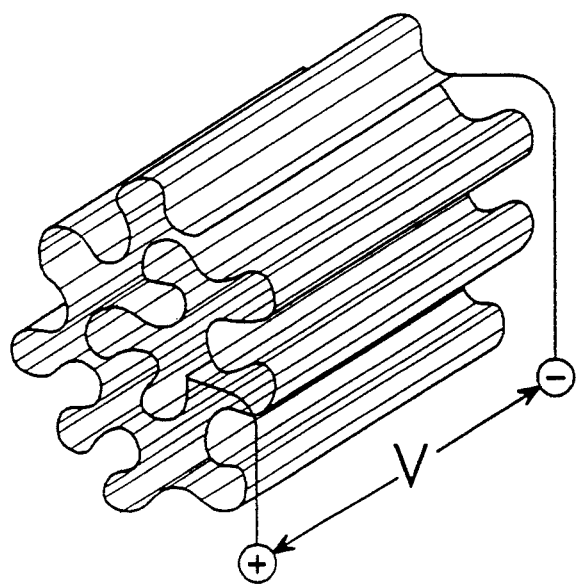
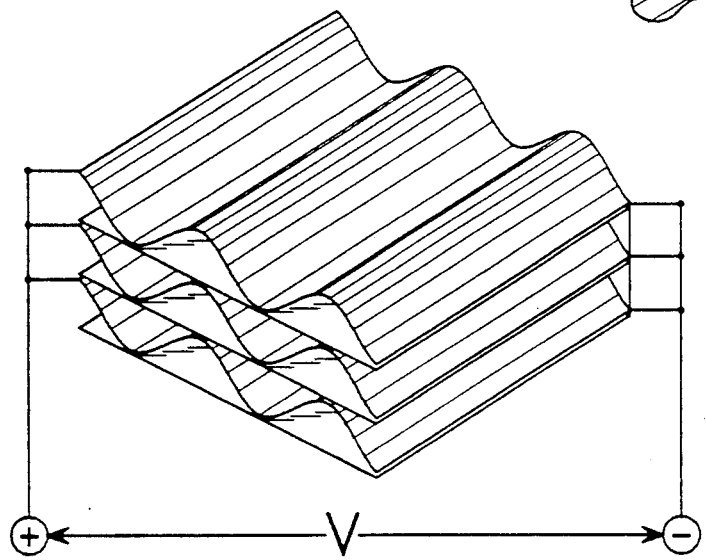
Fig. 1B
Fig. 2
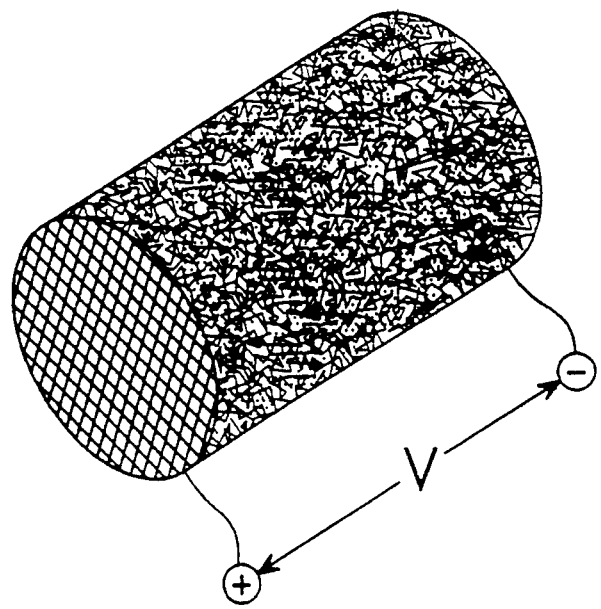

5,308,457

SELF-CONTAINED SYSTEM FOR CONTROLLING GASEOUS EMISSIONS FROM DILUTE ORGANIC SOURCES AND A PROCESS FOR USING THAT SYSTEM

FIELD OF THE INVENTION

This invention is a device and a process for controlling the emission of volatile organic components. The invention is useful on gaseous or vapor-containing streams containing minor amounts of organic material, particularly on fairly dilute streams or those containing only a few parts per million of the organic material. The device is useful in removing organics as might be found emanating from paint spray booths, restaurants, print shops, dry cleaners, furniture manufacturers, and bakeries.

The device may be two-stage including an adsorber and a catalytic oxidation reactor or may be of such a configuration that the same bed is used both as the adsorber and catalytic oxidation reactor. In the former configuration, a first stage contains an electrically conductive adsorbent bed, potentially comprising an adsorbent placed on a conductive support of fibers, foil, or other structure or where the adsorbent itself is the conductive support. The adsorbent removes the organic from the gaseous stream as that stream passes through. When the adsorbent is loaded with volatile organic, a voltage is applied to the conductive support and the adsorbed organic material is desorbed. The stream containing the desorbed organic is passed through a catalyst bed where a catalyst (which may also be on an electrically conductive support) oxidizes the volatile organic to a harmless material which may (perhaps after other treatment) be emitted to the atmosphere.

BACKGROUND OF THE INVENTION

Many industrial and commercial operations create exhaust streams which contain toxic or odorous organic compounds. Examples of such operations include paint spraying, plastic molding, gluing, rendering, and chemicals manufacturing. Commercial facilities such as restaurants, printing shops, cleaners, and bakeries also produce gas streams which when emitted to the atmosphere might be undesirable under increasingly stringent environmental laws. As concern about these hydrocarbon emissions grows and regulatory restrictions become more prevalent, the need for devices and processes to control the levels of volatile organic materials released into the atmosphere becomes more acute.

When the concentrations of volatile organics in an exhaust stream are high or when the emission sources are a part of a large industrial complex, control technologies have been developed to remove these materials from the streams. Sophisticated and large conventional thermal catalytic or scrubbing systems are the norm for removing volatile organic materials from waste streams containing high concentrations of organics. However, when the concentration of organics in the stream is quite low, large volumes of gas must be handled to capture the relatively small amounts of volatile organics. Additionally the packed beds of adsorbent used in the conventional technology require large gas handling devices to push the gas through those beds. These facts contribute to the high costs of conventional systems and the fact that many of them are not cost effective. In any event, such devices are disclosed in the following:

U.S. Pat. No. 3,930,803 to Winter shows a process and an apparatus for purifying a gas flow having combustible and vaporous or gaseous impurities. The air or gas flows through an adsorption filter. The adsorption filter may contain a material such as activated charcoal, silica gel, or zeolite. When the impurity level in the adsorption filter reaches a predetermined level of impurities, the impurities are desorbed in counterflow by a hot inert gas generated through the stoichiometric combustion of hydrocarbons. The desorbate which is carried away by the inert gas is then subsequently burned with additional air or with oxygen.

U.S. Pat. No. 4,088,460 to Winter discloses a process and apparatus similar to that found in Winter '803. This document, however, shows an improvement in which a protective gas generator is used to produce an inert gas which is then introduced into the adsorption zone prior to the introduction of hot inert gas. This protective gas limits the potential for the presence of an explosive mixture in the adsorption zone as the hot gas is introduced.

U.S. Pat. No. 4,565,553 to Nowack shows an industrial painting method and system having a washer, dry-off oven, spray booth, and bake oven. Solvent paint vapors from the spray booth are concentrated in a filter which is subsequently degassed by a flow of hot air from the dry-off oven. The degassed vapors are then admixed with the atmosphere of the bake oven. The bake oven atmosphere is continuously circulated to the washer and passed through the burner of the washer to incinerate solvent vapors. The gases produced by the incineration are carried to the dry-off oven to form the atmosphere there. The principal exhaust from the overall system is from the dry-off oven and is substantially free of solvent vapors and is of a fairly low temperature. The filters used to adsorb the solvent contaminants from the air may be carbon, silica gel, activated alumina, molecular sieves, and certain clays. Activated carbon is preferred. The solvent vapors are released from the filter by a countercurrent flow of heated air.

U.S. Pat. No. 4,737,164 discloses a process for recovering various volatile organic and inorganic impurities from gases using an adsorber which contains two layers of a fibrous activated carbon configured in the form of a cylinder. The cylindrical carbon layers are separated from each other by in insulating wall. The residual solvent in the air is adsorbed as it passes through the fibrous activated carbon. The solvent is desorbed by use of a low pressure steam flow or other inert gas while concurrently applying an electric current to the carbon fiber adsorption bed.

U.S. Pat. No. 4,846,852 to Schweitzer et al. discloses a method and apparatus for separating and recovering volatile solvents (such as that found in the exhaust of dry-cleaning machinery, metal degreasers, installations for cleaning electronic parts, solvent baths, etc.) by passing the exhaust gas alternatively through one of two beds of molecular sieve packings capable of adsorbing water vapors contained therein and through one of two beds of molecular sieve packings composed of a material suitable for adsorbing the solvent vapors contained therein. Heated air or inert gas is passed through the beds not in use to desorb the water vapor and solvent vapors and thereby regenerate the molecular sieve packings. The water and solvent are then condensed for ultimate recovery as liquids.

U.S. Pat. No. 4,863,494 to Hayes discloses a process for removing volatile organic compounds from air by passing the air through a bed of a divinylbenzene beads. The beads adsorb such materials as gasoline, benzene, chlorinated solvents, various alcohols, esters, acid gases, and the like. The beads are regenerated by passing a heated gas through the bed at a temperature as high as 290° C.

U.S. Pat. No. 4,902,311 to Dingfors et al. shows a method and an apparatus for removing various organic substances, primarily solvents, from industrial ventilation air contaminated with such substances. In the process, air containing the solvent is passed through an adsorbent comprising macroporous polymeric particles in a fluidized bed. The particles are fed continuously to the bed and then are fed continuosly to a desorption column. In the desorption column the solvent is desorbed from the adsorbent by the use of heated air. The desorbed material is drawn off to a cooler.

None of these patents suggest a process or a device in which an electrically conducting adsorbent or catalyst support is solely utilized to remove hydrocarbon contaminants from a highly dilute gaseous source.

Another choice for volatile organics removal is a continuous combustion unit to destroy the organics by oxidation or combustion at high temperature. At the level of volatile organics found in many waste streams, the heat from the combustion reaction is simply not sufficient to sustain the high temperatures necessary to destroy the organic material. Thus, unless the gas stream is already quite hot, a combustion unit requires additional energy input (most often by burning a fuel) for operation. This additional fuel requirement makes operating costs high and renders this option unattractive for small operations or dilute organic sources.

Although the use of activated carbon beds or cartridges is known in certain industries as a suitable approach for adsorbing small amounts of volatile organics as the stream passes through the beds, methods for regenerating the bed are difficult and often create an environmental hazard when releasing the organic from the bed. The cartridges are simply often discarded. Where steam stripping or thermal cycling is used, the energy costs are high. Typical of such devices are:

U.S. Pat. No. 3,274,755 to Montagnon et al. discloses a process in which a volatile solvent used in a dry-cleaning or de-greasing operation is absorbed from a vent stream using a carbon or charcoal bed. The solvent is said to be a chlorinated hydrocarbon. The carbon bed is regenerated by use of steam sparging in the direction opposite to the flow of the solvent-laden air.

Kokai 52-65,175 issued to Mitsui Kikinzoku Kogyo K.K. describes a process and an apparatus for treating a waste gas stream to remove low concentrations of combustible gases. The waste gas is passed through an adsorption zone which, in the example, is said to be a bed of activated carbon. In that example, toluene was removed from a gas stream. Some amount of combustible gas is apparently expected to pass through the activated carbon bed and into the following oxidation reactor. The oxidation reactor is then able to handle the lower concentration of the combustible component. Apparently this process has the effect of smoothing the concentration of the combustible component to a nearly constant level throughout the flow of the gas stream from the upstream batch reaction contemplated in the Kokai.

Again, neither of these documents utilizes a source of heat in which the adsorbent and the catalyst are found on an electrically conductive, heat-producing support.

Disclosures which do utilize a voltage differential in an adsorption process include the following.

U.S. Pat. No. 4,094,652 to Lowther discloses a system and process for regenerating an adsorbent bed of a dielectric absorbent particles by applying to those particles a high voltage electrical field (e.g., 0.2 to 500 Kv/cm) to separate substantially all of the adsorbed moisture as molecular water. The voltage may be applied either as a direct current or a low frequency pulsing or AC current (0–1000 Hertz). The advantages are said to be that the amount of time and energy required in regenerating the bed are less than for conventional regeneration procedures.

Kokai 54-160,589 issued to Toho Beslon K.K. suggests an adsorption/desorption unit made up of fibrous activated carbon. The active carbon is in the form of fiber mat containing discrete metal fiber heaters within the mat. The gas containing the offending hydrocarbon is passed through the carbon mat and is adsorbed onto the individual fibers. When the capacity of the mat is reached, an electric current is passed through the discrete metal wires included in the mat so as to raise the temperature of the carbon to 100° C. or 150° C. The heating causes the adsorbed material to desorb. In the example, an air flow containing trichloroethylene was treated using the process. The process had an overall recovery efficiency of 85%.

In summary, none of the noted disclosures show a process or device in which an adsorber and a catalytic oxidation reactor utilize an electrically conductive adsorbent bed or oxidation bed variously to raise the temperature of the adsorbent to desorb the hydrocarbon or to raise the temperature of the catalyst to support the oxidation reaction.

Our invention permits the use of low cost equipment. The energy costs are low. For many variations of the invention, the pressure drop across the bed or beds is low and the required gas-moving or gas-handling equipment is, by comparison, not expensive. The low pressure drop allows installation of the bed in existing exhaust blown vent systems.

SUMMARY OF THE INVENTION

This invention is a device and a process for controlling the emission of volatile organic components. The invention is potentially useful on gaseous or vapor-containing streams containing minor amounts of organic material, particularly on fairly dilute streams or those containing a few parts per million of the organic material. It may be used on streams containing hydrocarbons such as alkanes, olefins, acetyllinic materials; on oxygen-containing hydrocarbons such as alcohols, ethers, and ketones; on nitrogen-containing hydrocarbons such as amines; and the like. The device is useful in adsorbing organics as might be found emanating from paint spray booths, restaurants, print shops, dry cleaners, bakeries, and a variety of other point sources.

The device in its most basic form is a cooperative two-stage adsorber and reactor. A first stage contains an electrically conductive adsorbent bed. This bed may comprise an adsorbent placed on conductive fibers or a conductive corrugated metal strip which may be rolled into a monolith or the adsorbent itself may be conductive. The conductive fibers may be resistive heating materials such as carbon, silicon carbide, or certain metals. The adsorbent removes the organic from the gaseous stream as it passes through. When the adsorbent is loaded with volatile organic compounds, a voltage is applied to the conductive support and the adsorbed organic material is desorbed. The stream containing the desorbed organic is passed through a catalyst bed where a catalyst (which may also be on a support such as a mat of conductive fibers or a corrugated metal construction) oxidizes the volatile organic to a harmless material which may (perhaps after other treatment) be emitted to the atmosphere.

In another variation of the invention, a single bed acts both as adsorber and catalyst.

The device operates in the following manner. The gas containing the volatile organic passes through the first adsorbent stage. The volatile organic is adsorbed onto the adsorbent found there. The cleaned gas is then passed out of the unit into the atmosphere or, if appropriate, recycled. When the adsorbent bed nears saturation, it is taken off line and heated to desorb the volatile organics adsorbed. This heating is performed by inducing a current through the conductive support. A gas stream containing oxygen (typically air) carries the desorbed organics to the second stage or catalytic oxidation bed. There an oxidation catalyst oxidizes the volatile organics using the oxygen in the sweep gas used in the adsorber bed. The catalyst is also heated to an appropriate temperature by inducing the current through the catalyst carrier. If the volatile organic is a hydrocarbon or oxygen-containing hydrocarbon, the fully oxidized hydrocarbon (then in the form of $CO_2$ and water) may be released to the atmosphere. If the hydrocarbon is one containing sulfur, chlorine, or nitrogen, additional gas treatment steps may be appropriate.

BRIEF DESCRIPTION OF THE DRAWINGS

FIGS. 1A and 1B schematically show monolithic configurations of the catalyst and adsorber supports suitable for use in this invention.

FIG. 2 schematically shows a mat-containing configuration useful as the catalyst and adsorber of this invention.

DESCRIPTION OF THE INVENTION

Figure 3:
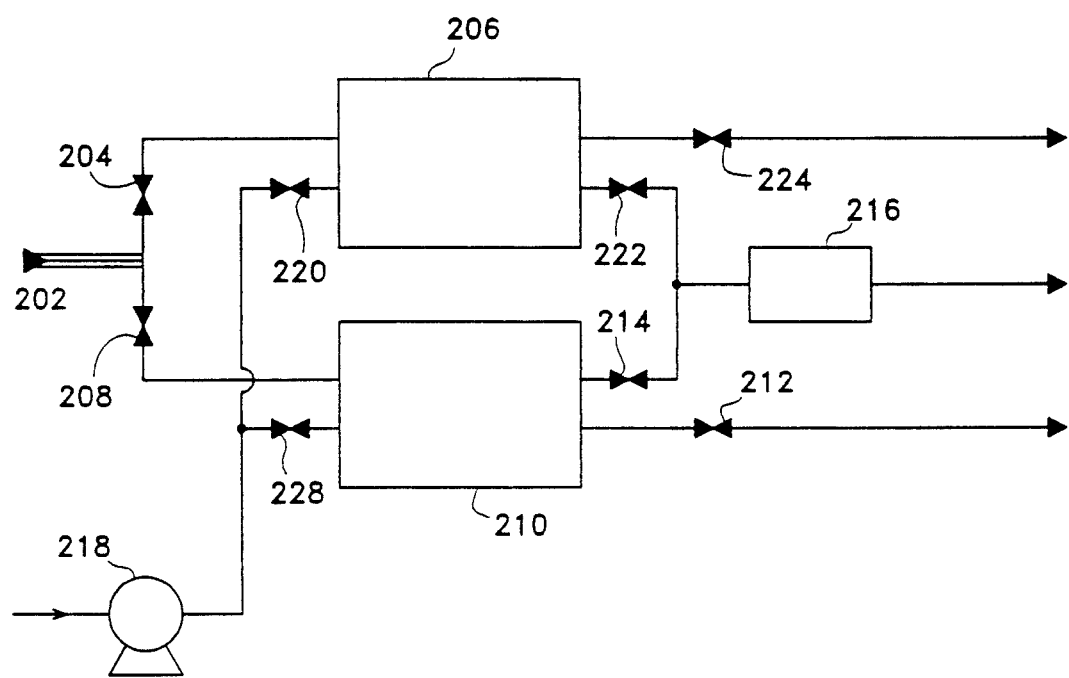
FIG. 3 portrays by flow diagram the operation of a unit as might be found in commercial installation.

This invention is a process and a device for eliminating minor amounts of volatile organic materials from gas streams containing them. It may be made up of two cooperative stages which may be located apart from each other but alternatively may be in the same bed or structure. The first or adsorbent stage is one in which an adsorbent is electrically conductive or is present on an electrically conductive support which may comprise a collection of fibers perhaps assembled in the form of a mat, granules, or a monolith assembled from a corrugated metal sheet. The adsorbent removes volatile material from the gas stream as the stream passes through the stage and later, during regeneration, the adsorbent gives up the volatile hydrocarbon upon heating. The heating is carried out by inducing a current through the adsorbent or conductive support. The second, or oxidation stage, is a gas permeable mass which may comprise a catalyst on a conductive support which may be a collection of fibers perhaps assembled in the form of a mat, granules, or a monolith assembled from a corrugated metal sheet. The catalyst is of a type that will oxidize the volatile hydrocarbon using oxygen in the sweep gas present during the regeneration step. It is often desirable to use more than one adsorbent bed stage so that one may be in use while another is being regenerated.

In another variation of the invention, a single bed acts both as adsorber and as catalyst. In this variation, the adsorbent is intermixed with the catalyst. The adsorbent removes the hydrocarbon at a relatively lower temperature and, when the adsorbent is sufficiently saturated with the hydrocarbon, an electrical current is introduced to the combination bed and the hydrocarbon is oxidized in-situ.

The Stream

The stream treated in this apparatus is one containing low levels (or concentrations) of volatile organics, desirably in air. Although the device could be made of a size which would be capable of treating streams containing more than 2% to 3% volatile organics, economics will typically tip the balance towards using another system more clearly attuned to recovering the concentrated organics or combusting them using catalytic incineration. This is true at least when the stream contains sufficient hydrocarbon to maintain the catalyst temperature at a required level without external fuel addition. This device is especially suitable for use on streams having less than 1000 ppm of volatile organic content. The volatile organics may be any of a large number of different adsorbable materials. For instance, they may be hydrocarbons: branched and linear alkanes, olefins, or acetylenes. They may also be oxygen-containing hydrocarbons such as alcohols, ethers, ketones, glycols, or complex carbohydrates. Less desirable volatile organics include nitrogen-containing organics (including amines and ammonia-containing gases) and sulfur-containing organics (including thiols, mercaptans, and sulfites). Clearly, the stream to be treated may contain mixtures of the organics.

Although there is no theoretical limit on the percentage of volatile organics contained by the stream, the practical aspects are that the stream should contain no more than about 1% of volatile organic lest the amount of adsorbent become excessive and the time between regenerations become quite short. This device and process will adsorb materials down to about ten ppm although this limit is obviously a function of the volatile organic, adsorbent, and bed configuration.

The stream may contain organics such as solvents emanating from paint spray booths, smoke and greases from restaurants, solvents from print shops, cleaning fluids from cleaners, and ethanol from rising bread in bakeries or fermentation in breweries.

Adsorbent Stage

The material in the adsorbent stage must fulfill the following parameters: it must be porous and gas permeable to allow gas flow through it; it must contain an adsorbent which will adsorb the desired organic at a lower temperature and desorb the organic at a higher temperature; and it must be electrically conductive so that upon imposition of an electrical current, the adsorbent will become heated and desorb the organic. The adsorbent may be of various configurations such as a monolith, a bed of granules, a fiber mat, or a network.

Metals suitable for the adsorbent core support such as might be used for a monolithic support include aluminum-containing steels (preferably in the form of corrugated foil) may be found in U.S. Pat. Nos. 4,414,023 to Aggen et al, 4,331,631 to Chapman et al, and 3,969,082 to Cairns et al. These steels, as well as others sold by Kawasaki Steel Corporation (RiverLite 20-5 SR), Vereinigte Deutchse Metallwerke AG (Alumchrom I RE), and Allegheny Ludlum Steel (Alfa-IV), contain sufficient dissolved aluminum so that (when oxidized) the aluminum forms alumina whiskers, crystals, or a layer on the steel's surface to provide a rough and chemically reactive surface for better adherence of any adsorbent. These steels are used as supports for automotive exhaust catalysts and are quite rugged.

Aluminum sheet is also acceptable if the adsorbent can be made to adhere to the metallic support.

A suitable structure using a metallic support for the inventive adsorber stage is shown in FIG. 1A. A metal sheet in the form of a long strip is corrugated in a cold rolling or other processing operation. The corrugated strip may be combined with a flat metal strip and rolled into a spiral to form a cylindrical, monolithic structure through which gas can flow with ease. Rather than a rolling operation, the corrugated and flat strips may be cut and layered in a structure such as found in FIG. 1B. In both the configurations shown in FIGS. 1A and 1B, means for passing current through the supports are displayed. The voltage passing through the support is sent from one end of the strip to the other. Because the wash coat applied to the support (discussed below) is typically an electrical insulator, the current will not shortcircuit.

The support may be granular although this configuration can cause a higher pressure drop through the adsorbent stage than might otherwise be desirable.

The support may be a mat or network of fibrous conductive material to which the adsorbent will adhere. The support may be a metal, carbon, vitreous carbon, silicon carbide, and similar materials which either are adsorbents themselves or form the core for other adsorbent materials.

The adsorbents may be formed as a surface coating on the support material or they may be placed as a coating on the supports. Preferred adsorbents include alumina and carbon. For non-polar hydrocarbon components, the preferred adsorbent is carbon, either graphitic or amorphous. The physical form of the carbon may be granular or in a foam configuration. The carbon's capacity for hydrocarbon adsorption is significantly increased by treating it at high temperature in air. Oxidic materials such as $Al_2O_3$, $SiO_2$, $TiO_2$, $ZrO_2$, or mixed oxides such as $SiO_2/Al_2O_3$ may also be used although they would likely adsorb water unless treated to make the surface more hydrophobic. Suitable treatments include coating the oxide with a thin coat of carbon, reacting the surface with a monolayer of hydrocarbon groups such as alkyl silanes or fatty amines, or by fluoriding the surface. Highly desirable is a fibrous silicon carbide material or a fibrous carbon material in which high temperature activation of the carbon creates an adsorbent layer on the carbon.

The adsorbent is used by placing it in a gas stream containing the dilute hydrocarbon. The outlet (or a point close to the outlet) in the bed is monitored for breakthrough of the volatile hydrocarbons. At that time, the gas containing the hydrocarbon is switched to another similar bed during the period the primary bed is regenerated. The bed is regenerated by inducing a current across the bed to heat it and, therefore, desorb the volatile organics which had been previously adsorbed. As is shown in FIG. 2, when using a fibrous bed the current may be applied to the bed through metal grids placed at the ends of the fibrous bed.

The volatile organics emanating from the adsorbent bed during regeneration are, desirably, carried to the catalyst oxidant bed by a sweep gas. Care needs to be taken to control the temperature in various of the adsorbent beds since carbon is obviously flammable (as are many of the volatile organics adsorbed in the adsorbent bed). Consequently, the oxygen content of the sweep gas and the temperature of the bed must be carefully controlled.

Catalyst Stage

In this stage, the desorbed volatile organics from the adsorbent stage are passed through a catalyst mass capable of oxidizing the volatile organics into $CO_2$ and water.

The catalyst supports suitable for this catalyst are the same as those noted above, e.g., carbon, vitreous carbon, silicon carbide, and certain metals such as aluminum-containing steel. Although carbon, activated carbon, and alumina are suitable for coating the catalyst supports, a very desirable material because of its high temperature stability is alumina. We have found that most of the catalyst supports can be readily coated with a high surface area alumina via the use of well known "washcoating" techniques commonly used for applying alumina within the channels of monolithic (honeycomb) support structures. This alumina-containing washcoat sol may be made by ball milling alumina or alumina hydrate (bayerite or gamma-alumina hydrate) particles for a time sufficient to produce a sol. The resulting suspension of fine solid particles is applied to the support by dipping, spraying, pouring, etc. When the sample is subsequently dried, a thin coating of alumina particles remains on the support surface. The sol is especially desirable when using fibers in this service since it adheres along the shafts of the various fibers in the mat rather than clumping at the intersections of the fibers. Oxidic materials such as $SiO_2$, $TiO_2$, $ZrO_2$, or mixed oxides such as $SiO_2/Al_2O_3$ may also be used as the sol.

The catalyst itself is either a metal or metal oxide oxidation catalyst. Metals from Mendeleev Groups IB, IIB, VB, VIB, VIIB, and VII or their oxides are acceptable as catalysts but preferable (because of their high activity and stability) are the Group VIII noble metals. Especially preferred are platinum, palladium, rhodium, and mixtures thereof. The catalyst is prepared by application of the appropriate metal to the support or its washcoat using impregnation or other methods known in this art.

The catalyst is used in the following fashion. Desorbed volatile organics from the adsorption step are passed through the catalyst after it has been heated to an appropriate operating temperature. The temperature of the catalyst is raised by applying a current across the conductive support. For instance, temperatures of 250° C. to 400° C. (especially 250° C. to 280° C.) are appropriate for an alumina catalyst containing 5% palladium when used on a methyl-ethyl-ketone air mixture.

Again, care must be taken to control the temperature of the oxidative catalyst bed when the support coating is carbon lest the oxygen and the catalyst cooperate to cause combustion of the catalyst itself.

System Operation

FIG. 3 shows the typical operation of one configuration of the adsorber and the catalyst in a swing operation. Exhaust containing volatile organics enters through line 202; valve 204 is closed because adsorber 206 is in the regeneration cycle. Valve 208 is open and the exhaust gas containing the volatile organic passes into adsorber 210 where the volatile organics are adsorbed. The cleansed exhaust gas stream then passes out of the adsorber through valve 212 which is open into the open atmosphere, if appropriate. Valve 214 from the adsorber bed 210 into the catalyst 216 is closed but would be opened during a regeneration cycle.

Meanwhile, a voltage has been applied to the adsorbent bed found in adsorber 206. Blower 218 passes air through valve 220 into adsorber 206 where it picks up the desorbed volatile organics. Valve 222 into catalyst 216 is open. Valve 224 is closed during the regeneration cycle. The oxygen in the air passing through the catalyst bed 216 oxidizes the volatile organics and the resultant product gas contains only $CO_2$ and water if the volatile organic was an oxygen containing hydrocarbon or a hydrocarbon. When the regeneration of adsorber 206 is complete and adsorber 210 is saturated, adsorber 206 is placed on line by closing valve 208, opening valve 204, closing valve 222, and opening valve 224. Valve 212 is closed as well. A voltage is applied to the adsorber bed in adsorber 210; air from blower 218 passes through valve 228 into adsorber 210, through valve 214, and into catalyst bed 216 where the volatile organics are oxidized. The clean exhaust stream is then disposed of.

The invention has been explained by direct description. The following is an example showing the operability of the invention. The example is only an example of the invention. It should not be used to limit the scope of the claimed invention in any way.

EXAMPLES

The following example demonstrates the concept of adsorbing a volatile organic (in this case, the oxygen-containing hydrocarbon is methyl-ethyl-ketone or MEK) on a conductive adsorbent, desorbing the MEK, and oxidizing the MEK on a conductive catalyst.

The adsorbent stage material was a fibrous carbon having a bulk density of 0.057 gm/cm$^3$ (supplied by Energy Research and Generation, Inc. of Oakland, Calif.) which had been heat treated for one hour in air at 400° C. to enhance the MEK adsorbance. The resulting material had a surface area of 445 m$^2$/gm. The treated material adsorbed 6.0% to 10.0% by weight of MEK in tests using flowing gas streams containing 225 ppmw to 2800 ppmw of MEK.

The catalyst stage material was prepared by placing alumina on a fibrous silicon carbide (SiC) and introducing palladium into the alumina. The alumina which was deposited on the SiC fibers was made by ball milling a hydrated bayerite (VERSAL B) (125 g) in water (165 ml) and concentrated nitric acid (21.5 ml) for 48 hours. The hydrated alumina was calcined at 400° C. for 25 hours. The fibrous SiC material was dipped in the resulting alumina slurry and dried at room temperature and at 110° C. overnight. The sample contained about 30% to 35% by weight of alumina. The alumina/SiC composite was then dipped into an aqueous solution of disodium tetrachloropalladate, dried at 110° C. overnight, and calcined for three hours at 400° C. in air. The catalyst had a palladium content of about 1% by weight.

The MEK for this example was added to an air stream to form a stream containing 250 ppm. The MEK/air stream was passed through the adsorbent material in a laboratory setup until breakthrough of 20 ppmw of MEK at the outlet of the bed was observed.

After breakthrough, the effluent from the adsorbent bed was directed through a bed of catalyst controlled at a temperature of 344° C. The adsorbent was then heated to 250° C. to desorb the MEK, and the MEK was carried in flowing air into the catalyst bed.

This sequence of adsorption, desorption, and combustion was repeated a number of times. The results of these runs are shown in FIGS. 4 and 5.

Figure 4:
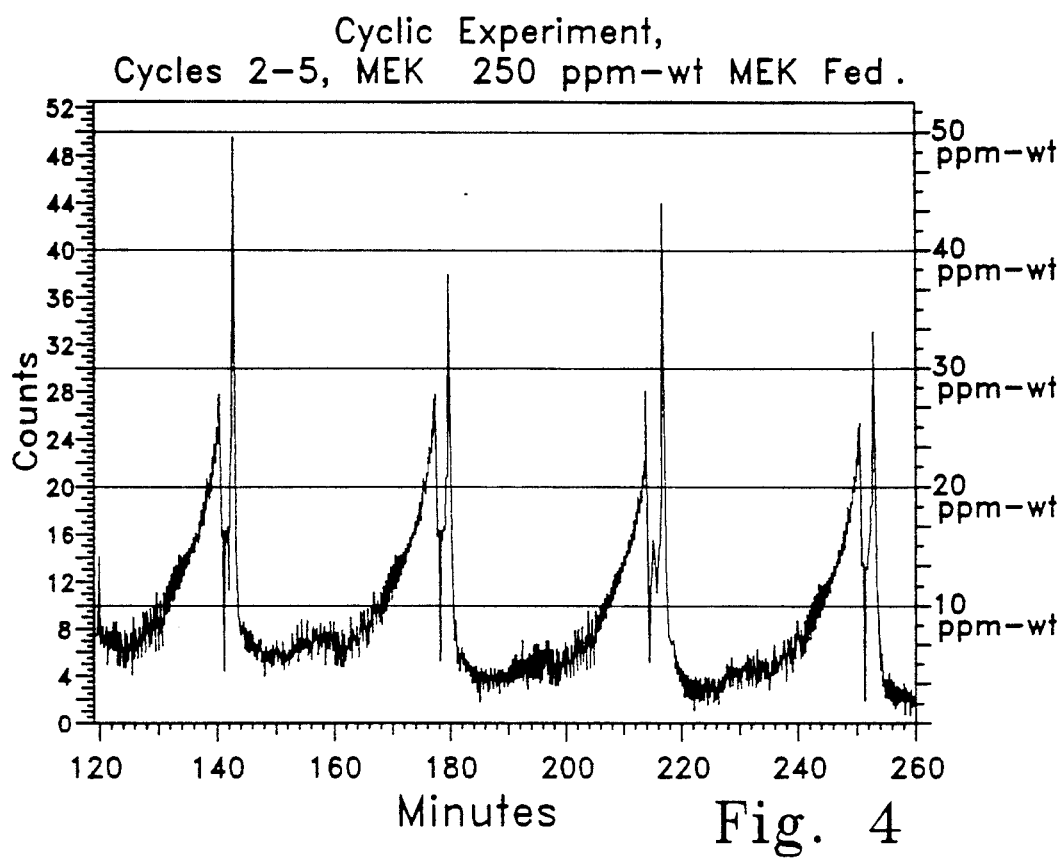
FIGS. 4 and 5 show contents of exit gases ($CO_2$ and MEK) during operation of the inventive device in the Example.

FIG. 4 shows the MEK content of the gas stream at the outlet of the system. The breakthrough of MEK in each cycle was reflected in the relatively slow rise in the signal from about five ppmw to about 25 ppmw. The signal then decreased suddenly when the hot catalyst was switched into the stream. The subsequent spike represents the small amount of desorbed MEK which was not completely oxidized by the catalyst.

Figure 5:
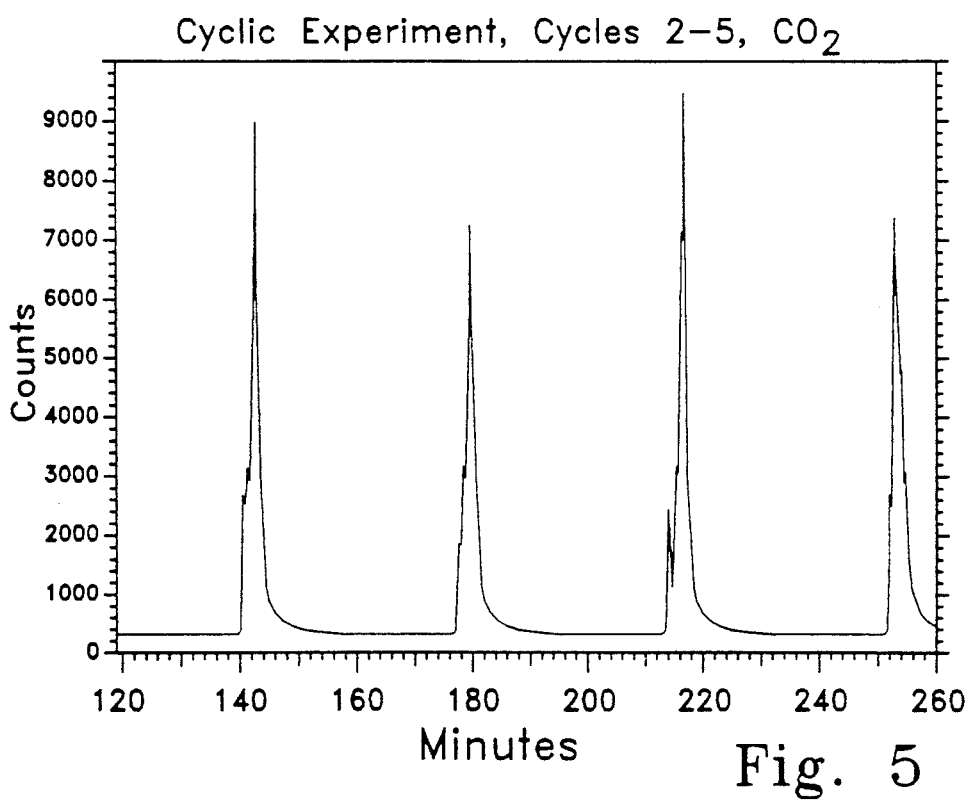

FIG. 5 shows the $CO_2$ content at the outlet of the catalyst bed during catalyst operation.

Measurements of $CO_2$ and MEK were made using a mass selective detector (MSD; Hewlett-Packard 5790B).

Integration of the results shows that 96% of MEK introduced into this laboratory test was adsorbed and then oxidized.

This invention has been described in writing and by example. It will be apparent to one having ordinary skill in this art that equivalent materials may be used in the place of those claimed and yet still be within the spirit of this invention.

We claim as our invention:
1. A volatile organic control device comprising:
   a. an adsorber adapted to adsorb volatile organics from a gas steam passing through the adsorber comprising a first gas permeable, electrically conducting mass comprising a member selected from carbon, vitreous carbon, silicon carbide, or metals having thereon adsorbent suitable for adsorbing volatile organics at a relatively lower temperature and desorbing volatile organics at a relatively higher temperature when the electrically conducting mass has a current passing through it, and
   b. an oxidation catalyst adapted to oxidize the volatile organics desorbed from the adsorber and comprising a second, gas permeable, electrically conducting mass comprising a member selected from carbon, vitreous carbon, silicon carbide, or metals having thereon a catalyst suitable for oxidizing the desorbed volatile organics when the electrically conducting mass has a current passing through it.

2. The device of claim 1 where at least one of the electrically conducting masses comprises a metal support.

3. The device of claim 2 where the metal support comprises a corrugated material.

4. The device of claim 2 where the adsorbent is selected from alumina and carbon.

5. The device of claim 2 where the oxidation catalyst is selected from Mendeleev Groups IB, IIB, VB, VIB, VII, and their oxides.

6. The device of claim 5 where the oxidation catalyst is selected from Group VIII noble metals.

7. The device of claim 1 where the adsorbent is selected from alumina, activated carbon, or carbon.

8. The device of claim 1 where the first electrically conducting mass comprises vitreous carbon.

9. The device of claim 8 where the first electrically conducting mass comprises vitreous carbon which has been activated by heat treatment to form the adsorbent.

10. The device of claim 1 where the first electrically conductive mass comprises silicon carbide.

11. The device of claim 1 where the adsorbent is selected from one or more oxidic materials selected from $Al_2O_3$, $SiO_2$, $TiO_2$, $ZrO_2$, or mixtures.

12. A process for controlling the emission of dilute hydrocarbons in a gaseous stream comprising the steps of:
   a. contacting a gaseous stream containing dilute hydrocarbons with an adsorbent stage, the adsorbent stage comprising a first gas permeable, electrically conductive support having thereon an adsorbent suitable for adsorbing the dilute hydrocarbons, the adsorbent stage support material being selected from the group consisting of carbon, vitreous carbon, silicon carbide, and metals,
   b. passing an electrical current through the first gas permeable, electrically conductive support in the adsorbent stage to cause the adsorbent to desorb the dilute hydrocarbon upon heating,
   c. contacting the desorbed dilute hydrocarbon with an oxidation stage, the oxidation stage comprising a second gas permeable, electrically conductive support having thereon an oxidation catalyst suitable for oxidizing the dilute hydrocarbon, the oxidation stage support material being selected from the group consisting of carbon, vitreous carbon, silicon carbide, and metals.

13. The process of claim 12 where at least one of the electrically conducting masses comprises a metal support.

14. The process of claim 13 where the metal support comprises a corrugated material.

15. The process of claim 13 where the adsorbent is selected from alumina and carbon.

16. The process of claim 13 where the oxidation catalyst is selected from Mendeleev Groups IB, IIB, VB, VIB, VIII, and their oxides.

17. The process of claim 16 where the oxidation catalyst is selected from Group VIII noble metals.

18. The process of claim 16 where the oxidation catalyst is operated in the range of 250° C. to 400° C.

19. The process of claim 18 where the oxidation catalyst is operated in the range of 200° C. to 250° C.

20. The process of claim 12 where the adsorbent is selected from alumina, activated carbon, or carbon.

21. The process of claim 12 where the first electrically conducting mass comprises vitreous carbon.

22. The process of claim 21 where the first electrically conducting mass comprises vitreous carbon which has been activated by heat treatment to form the adsorbent.

23. The process of claim 12 where the first electrically conductive mass comprises silicon carbide.

24. The process of claim 12 where the adsorbent is selected from one or more oxidic materials selected from $Al_2O_3$, $SiO_2$, $TiO_2$, $ZrO_2$, or mixtures.

* * * * *